United States Patent [19]
Burnside

[11] 4,017,772
[45] Apr. 12, 1977

[54] TURN SIGNAL WIRING REPLACEMENT HARNESS

[76] Inventor: Ernest Burnside, 3843 Rohns, Detroit, Mich. 48214

[22] Filed: May 22, 1975

[21] Appl. No.: 580,012

[52] U.S. Cl. .............................. 361/428; 174/72 A; 340/81 R
[51] Int. Cl.² ...................... H02B 1/20; B60Q 1/46
[58] Field of Search ......... 317/112, 122; 174/72 R, 174/72 A; 200/61.27; 315/82, 83; 307/10 R, 10 LS; 340/74, 76, 81 R, 81 F

[56] References Cited
UNITED STATES PATENTS

| | | | |
|---|---|---|---|
| 2,203,502 | 6/1940 | Michel | 307/10 LS |
| 3,128,214 | 4/1964 | Lay | 174/72 A |
| 3,165,716 | 1/1965 | Epstein | 340/81 F |
| 3,340,503 | 9/1967 | Johnston | 340/81 R |
| 3,369,147 | 2/1968 | Ramsey | 315/83 |
| 3,434,106 | 3/1969 | Lawless | 340/81 R |
| 3,836,415 | 9/1974 | Hilderbrandt | 174/72 A |

*Primary Examiner*—Gerald P. Tolin
*Attorney, Agent, or Firm*—Willis Bugbee

[57] ABSTRACT

This turn signal wiring replacement harness is adapted to be owner-installed in place of the worn-out or defective factory-installed signal circuit wiring. It consists of a main flexible conduit containing wiring to a flasher, signal light and signal switch on the dash board, for connection to the storage battery. The main conduit has a pair of flexible conduit branches through the right branch of which wires lead to the front and rear right turn signal lights; and through the left branch of which other wires lead to the front and rear left turn signal lights.

1 Claim, 2 Drawing Figures

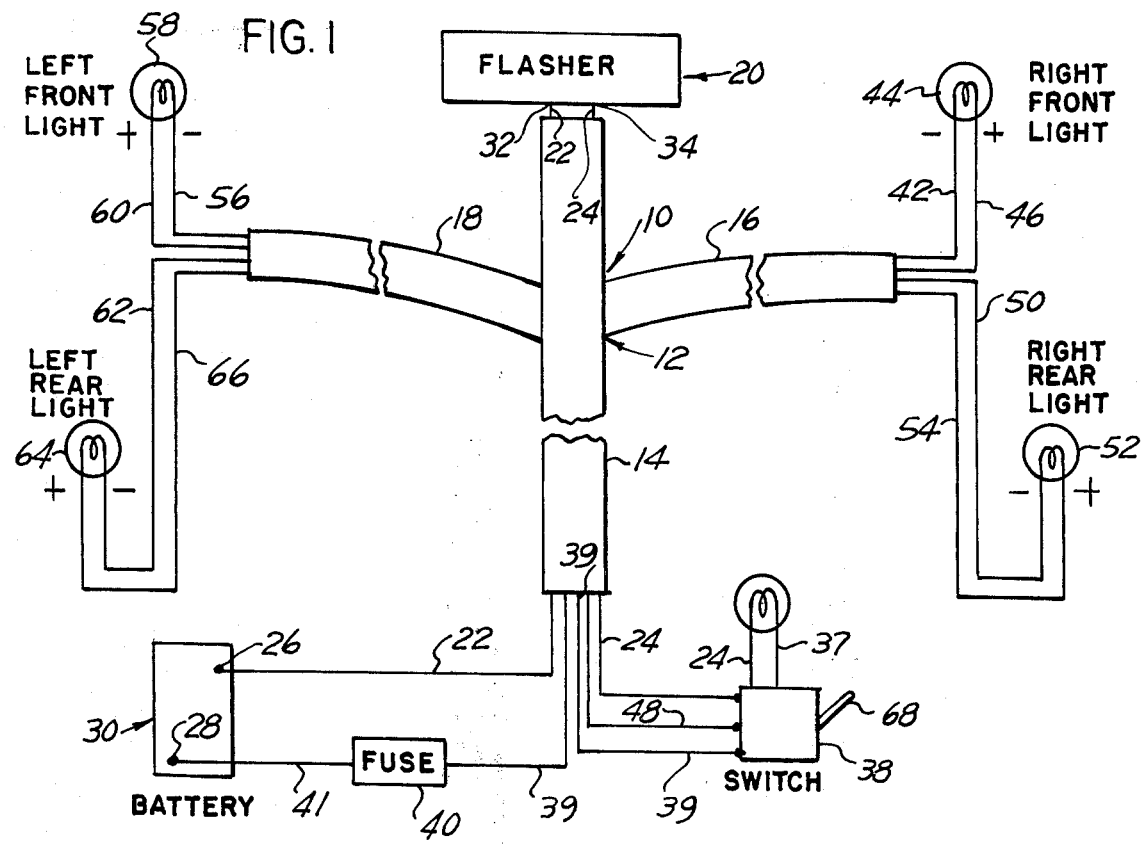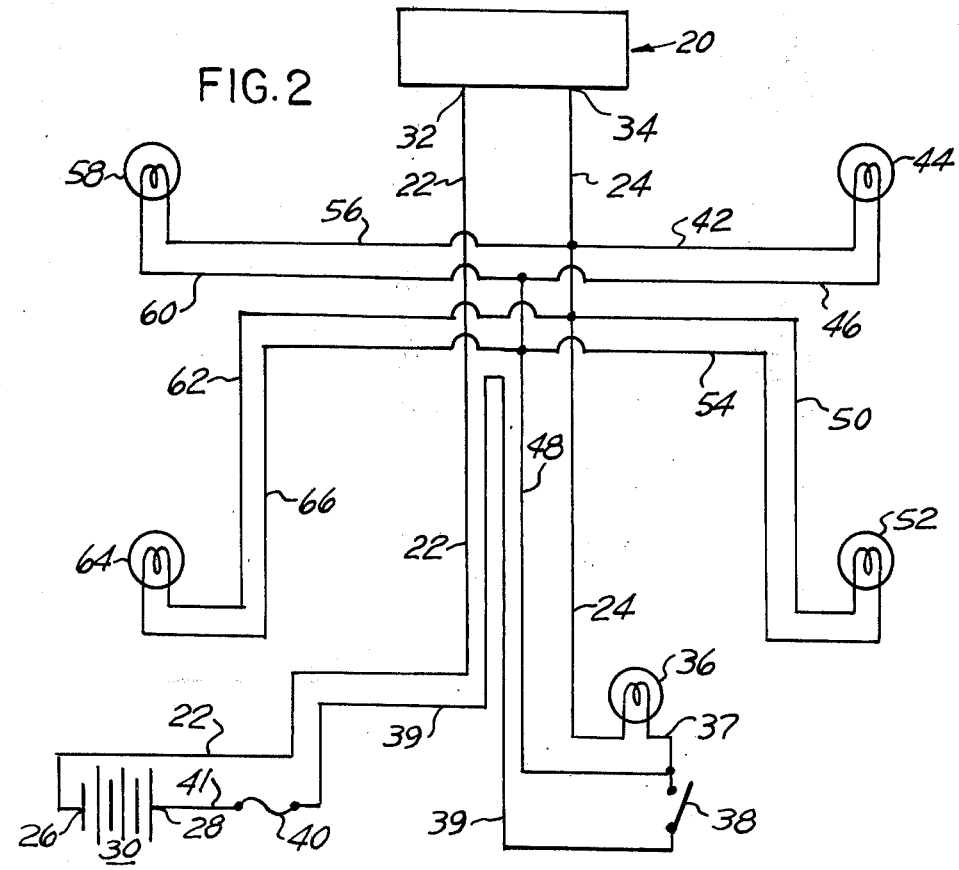

TURN SIGNAL WIRING REPLACEMENT HARNESS

BACKGROUND AND PROBLEM OF THE INVENTION

Hitherto, automotive vehicles, especially passenger vehicles, come equipped with factory-installed wiring for the four turn signal lights mounted on the right and left front and rear ends of the vehicle. In the course of time, such wiring frequently deteriorates either by accident or wear, and the replacement of its individual factory-installed wires is a laborious and expensive operation requiring expert electrical labor. Such labor is ordinarily available only in a large automotive repair shop or in a specialized automotive electrical establishment. The present invention enables this wiring to be replaced by the owner of the vehicle and involves a simple procedure and at low cost.

SUMMARY OF THE INVENTION

The invention particularly resides in a main flexible conduit containing the main wiring between the storage battery, the flasher and the dash switch and signal light and the right and left branch conduits containing the right and left front and rear turn signal light wiring. During installation, the factory-installed turn signal light wiring is disconnected at the turn signal lights and battery and is left in position, while the present wiring replacement harness is installed by its side.

In the drawing,

FIG. 1 is a diagrammatic view and wiring diagram of the turn signal wiring replacement harness, according to one form of the invention, with portions of the main conduit and its two branches broken away to conserve space; and FIG. 2 is a wiring diagram of the turn signal wiring replacement harness of the circuit shown in FIG. 1, with the main and branch conduits omitted.

Referring to the drawing in detail, FIG. 1 shows a turn signal wiring replacement harness, generally designated 10, according to one form of the invention as including a twin-branched approximately cruciform flexible wiring conduit 12 consisting of a main conduit portion 14 and right and left conduit branches 16 and 18 respectively. Beyond one end of the main conduit 12 is mounted a conventional flasher 20 adapted to be installed in any convenient location, such as on the engine compartment fire wall or bulkhead. Such flashers 20 are well known and available on the open market, and their details are beyond the scope of the present invention. One such flasher is sold under the trade name "Tungsol" and is disclosed and claimed in U.S. Pat. No. 2,218,415.

The main conduit portion 14 contains first and second main conduit wires 22 and 24 adapted to be energized directly and indirectly respectively from the terminals 26 and 28 of the vehicle storage battery 30. As shown in FIG. 2, the first main conduit wire 22 leads directly to one terminal 32 of the flasher 20, from the other terminal 34 of which the second main conduit wire 24 leads through the conduit 14 to one terminal of an energization-condition signal lamp 36, from the other terminal of which a wire 37 runs to one terminal of a turn signal operating switch 38 upon the casing of which the signal lamp 36 is mounted. The other terminal of the turn-signal operating switch 38 is connected by a fourth main conduit wire 39 to one terminal of a fuse 40, the other terminal of which is adapted to be connected by a wire 41 to the other terminal 28 of the storage battery 30.

The right conduit branch 16 contains a branch wire 42 leading from the second main wire 24 to the right front signal lamp 44 from which a branch wire 46 leads to a connection with a third main wire 48 in the main conduit portion 14. The third main wire 48 leads to one terminal of the dash switch 38 from the other terminal of which the wire 39 leads to the fuse 40 and thence through a wire 41 back to the battery terminal 28. In a similar manner, a branch wire 50 leads from the second main conduit wire 24 to the right rear signal lamp 52 from which a branch wire 54 leads back to the third main conduit wire 48. In a similar manner, a branch wire 56 leads from the second main conduit wire 24 to the left front signal which the wire lamp 58 from which leads back to the third main conduit wire 48. Finally, in a similar manner, a branch wire 62 leads from the second main conduit wire 24 to the left rear signal lamp 64 from which a branch wire 66 leads back to the third main conduit wire 48.

In the installation of the turn signal wiring replacement harness 10 of the present invention, the installer first disconnects the factory-installed wires from the left front and rear signal lamps 58 and 64, the right front and rear signal lamps 44 and 52, the battery 30 and the turn signal switch with which the car comes equipped. He then places the wiring replacement harness 10 in the most convenient and accessible location on the automobile or other vehicle. He next mounts the dash signal switch 38 carrying the dash signal lamp 36 in a convenient location on the dash or instrument panel or on the steering post of the car. The installer then mounts the flasher 20 in a convenient location, such as on the fire wall or engine compartment bulkhead and connects the first and second main conduit wires 22 and 24 to the terminals 32 and 34 of the flasher 20.

The installer then connects the branch wires 42 and 46 to the right front signal lamps 44, the left branch wires 56 and 60 to the left front signal lamp 58, the branch wires 50 and 58 to the right rear signal lamp 52, and the left branch wires 62 and 66 to the left rear signal lamp 64. The installer next connects the second main conduit wire 24 to one side of the dash signal lamp 36, the other side of which is already connected inside the casing of the dash signal switch 38 by the wire 37 to one side of the dash signal switch 38. He then connects the third main conduit wire 48 to the same side of the dash signal switch 38, to the other side of which he then connects one end of the fourth main conduit wire 39, the other end of which he connects to one side of the fuse 40. Finally, he connects the wire 41 at one end to the other side of the fuse 40 and then connects the other end of the wire 41 to the terminal 28 of the battery 30, completing the circuit.

In the operation of the turn signal installation replacement harness 10 of the present invention, as thus installed, to signal a turn in either direction, the operator shifts the handle 68 of the dash switch 38, thereby closing the circuit from the storage battery 30 through the flasher 20 to all four of the turn signal lamps 44, 52, 58 and 64. If the vehicle is in the right lane of the roadway, it is obviously going to turn right, whereas if it is in the center lane it is obviously going to turn left. Thus, the position of the vehicle indicates the direction in which the vehicle is to turn, and the simultaneous flashing of all turn signal lights 44, 52, 58 and 64 indicates that a turn is to be made.

I claim:

1. A motor vehicle turn signal wiring replacement harness adapted to be owner-installed between the right and left front and rear turn signal lights and the two terminals of the vehicle storage battery and the conventional turn signal operating switch already present in the vehicle, said harness comprising an approximately cruciform electrical wiring conduit of flexible material having a main conduit portion and right and left branch conduit portions stemming from said main conduit portion near one end thereof, a flasher disposed at one end of said main conduit portion and having terminals, a first main conduit wire disposed in said main conduit portion and connected at one end to one terminal of said flasher and adapted to be connected at its other end to one terminal of the vehicle storage battery, a second main conduit wire disposed in said main conduit portion and connected at one end to the other terminal of said flasher and at its other end to one side of said signal operating switch, a third main conduit wire disposed in said main conduit and connected at one end to said one side of said operating switch, a pair of right front turn signal light energizing wires and a pair of right rear turn signal light energizing wires adapted to be connected respectively to the right front turn signal light and right rear turn signal light of the vehicle, a pair of left front turn signal light energizing wires and a pair of left rear turn signal light energizing wires adapted to be connected respectively to the left front and left rear turn signal lights of the vehicle, one of said turn signal light energizing wires of each of said pairs being connected at one of the ends thereof to said second main conduit wire and the other of said turn signal light energizing wires of each of said pairs being connected at one of the ends thereof to the other end of said third main conduit wire, and a fourth main conduit wire disposed in said main conduit and connected at one end to the other side of said operating switch and adapted to be connected at its other end to the other terminal of the vehicle storage battery, said pairs of said energization wires for said right front and rear turn signal lights being disposed within said right branch conduit portion, and said pairs of said energization wires for said left front and rear turn signal lights being disposed within said left branch conduit portion.

* * * * *